United States Patent
Sawai

(10) Patent No.: US 9,416,048 B2
(45) Date of Patent: Aug. 16, 2016

(54) CRYSTALLIZED GLASS

(71) Applicant: OHARA INC., Kanagawa (JP)

(72) Inventor: Ryo Sawai, Kanagawa (JP)

(73) Assignee: OHARA INC., Kanagawa (JP)

( * ) Notice: Subject to any disclaimer, the term of this patent is extended or adjusted under 35 U.S.C. 154(b) by 0 days.

(21) Appl. No.: 14/528,112

(22) Filed: Oct. 30, 2014

(65) Prior Publication Data

US 2015/0119227 A1 Apr. 30, 2015

(30) Foreign Application Priority Data

Oct. 31, 2013 (JP) .................................. 2013-226567
Sep. 25, 2014 (JP) .................................. 2014-195401

(51) Int. Cl.
| | |
|---|---|
| *C03C 10/14* | (2006.01) |
| *C03C 10/12* | (2006.01) |
| *C03C 10/00* | (2006.01) |
| *C03C 1/00* | (2006.01) |
| *C03C 3/097* | (2006.01) |

(52) U.S. Cl.
CPC ............. *C03C 10/0027* (2013.01); *C03C 1/004* (2013.01); *C03C 3/097* (2013.01); *C03C 2204/00* (2013.01)

(58) Field of Classification Search
CPC .................................................. C03C 10/0027
See application file for complete search history.

(56) References Cited

U.S. PATENT DOCUMENTS

| | | | | | |
|---|---|---|---|---|---|
| 3,977,886 | A | * | 8/1976 | Muller | ................ C03C 10/0027 501/4 |
| 5,972,816 | A | * | 10/1999 | Goto | ....................... C03C 3/097 428/846.9 |
| 6,001,445 | A | * | 12/1999 | Itoh | ....................... C03C 3/076 428/64.1 |
| 8,043,985 | B2 | * | 10/2011 | Yagi | ................... C03C 10/0027 501/4 |
| 8,257,831 | B2 | * | 9/2012 | Yagi | ....................... C03C 3/083 428/426 |
| 9,115,023 | B2 | * | 8/2015 | Beall | ....................... C03B 20/00 |
| 2005/0197242 | A1 | * | 9/2005 | Mitra | ................... C03C 10/0027 501/7 |
| 2007/0281849 | A1 | * | 12/2007 | Yagi | ................... C03C 10/0009 501/4 |
| 2008/0268295 | A1 | | 10/2008 | Yagi | |
| 2011/0207591 | A1 | | 8/2011 | Schreder et al. | |
| 2014/0066285 | A1 | * | 3/2014 | Beall | ....................... C03B 20/00 501/32 |
| 2014/0356608 | A1 | | 12/2014 | Naumann | |

FOREIGN PATENT DOCUMENTS

| | | |
|---|---|---|
| DE | 102012202695 A1 | 8/2013 |
| EP | 0843304 A1 | 5/1998 |
| EP | 1864952 A1 | 12/2007 |
| JP | 2011-173748 | 9/2011 |
| JP | 2011-201763 | 10/2011 |

OTHER PUBLICATIONS

Extended European Search Report dated Apr. 15, 2015 issued in the corresponding European patent application No. 14191096.8.

* cited by examiner

*Primary Examiner* — Karl Group
(74) *Attorney, Agent, or Firm* — Rankin, Hill & Clark LLP

(57) ABSTRACT

To provide a crystallized glass capable of attaining the same clarification effect as in the composition containing an arsenic component and an antimony component even in the case of having the composition containing no arsenic component, while maintaining various physical properties peculiar to a $Li_2O$—$Al_2O_3$—$SiO_2$-based crystallized glass. Disclosed is a crystallized glass which is characterized by containing a predetermined amount of $Li_2O$, $Al_2O_3$, and $SiO_2$ components (on an oxide basis), and containing a predetermined amount of BaO component (on an oxide basis) and the like. This crystallized glass preferably contains β-quartz and/or β-quartz solid solution as main crystal phase(s), an average crystal particle size of the main crystal phase(s) being preferably within a range between 5 and 200 nm.

6 Claims, No Drawings

CRYSTALLIZED GLASS

This application is based on and claims the benefit of priority from Japanese Patent Application Nos. 2013-226567 and 2014-195401, respectively filed on 31 Oct. 2013 and 25 Sep. 2014, the contents of which are incorporated herein by reference.

BACKGROUND OF THE INVENTION

1. Field of the Invention

The present invention relates to a $Li_2O$—$Al_2O$—$SiO_2$-based crystallized glass.

2. Related Art

A $Li_2O$—$Al_2O_3$—$SiO_2$-based crystallized glass containing β-quartz and/or β-quartz solid solution has a low average expansion coefficient, and useful physical properties intrinsic to a crystallized glass based on this system, such as high rigidity and ultra-surface-smoothness after polishing. Because of these characteristics, there have been made a study of use of the crystallized glass based on this system as a mirror substrate material and a photomask substrate material of a next-generation semiconductor production device in which extreme ultraviolet lithography (EUVL) technology using extreme ultraviolet rays as a light source is employed. The crystallized glass required for these applications has been required to contain fewer remaining bubbles, which exert an influence on a surface shape, so as to have ultra-surface-smoothness.

Meanwhile, in the $Li_2O$—$Al_2O_3$—$SiO_2$-based crystallized glass, a precursor glass commonly has a high melting temperature of 1,450 to 1,600° C. in the production process thereof. In this crystallized glass, a clarifying agent has been added for the purpose of homogenizing and clarifying the glass melt during melting of the production process, and an arsenic component has frequently been used as the clarifying agent having the effect within the above-mentioned high temperature range. However, the arsenic component may exert an adverse influence on the human body and environment, and requirements of refraining from use of these components as much as possible have become higher and higher.

Patent Document 1: Japanese Unexamined Patent Application, Publication No. 2011-173748

Patent Document 2: Japanese Unexamined Patent Application, Publication No. 2011-201763

Patent Documents 1 and 2 mentioned above disclose $Li_2O$—$Al_2O_3$—$SiO_2$-based crystallized glasses, and suggest some clarifying agents other than an $As_2O_3$ component and an $Sb_2O_3$ component.

In Patent Document 1, the clarification effect is exerted by inclusion of rare earth oxide and halogen when a $Li_2O$—$Al_2O_3$—$SiO_2$-based glass material is melted. However, halogen such as Cl and a compound containing halogen used in a glass material in Patent Document 1 are toxic, and apply a large burden on the human body and production facilities. The rare earth oxide used in Patent Document 1 is disadvantageous in view of stable supply and cost.

In Patent Document 2, the clarification effect is exerted by inclusion of $SnO_2$ and additional clarifying agents such as $Sb_2O_3$, $Cl^-$, $Br^-$, and $SO_4^{2-}$ when a $Li_2O$—$Al_2O_3$—$SiO_2$-based glass material is melted. However, in a crystallized glass of Patent Document 2, $SnO_2$ is used as the clarifying agent and there is a problem that desired physical properties cannot be obtained by devitrification of the crystallized glass. Among additional clarifying agents in Patent Document 2, Cl and Br, and a compound containing Cl and Br are toxic and apply a large burden on the human body and production facilities. In Patent Document 2, $Sb_2O_3$, which is a component capable of becoming environmentally harmful, is used as additional clarifying agents, thus being disadvantageous in view of an environmental burden.

SUMMARY OF THE INVENTION

An object of the present invention is to provide a crystallized glass capable of attaining the same clarification effect as in the composition containing an arsenic component and an antimony component even in the case of having the composition free from a component which exerts an adverse influence on the human body and environment such as an arsenic component, while maintaining various physical properties peculiar to a $Li_2O$—$Al_2O_3$—$SiO_2$-based crystallized glass.

The present inventors have intensively studied so as to attain the object mentioned above and, as a result, the present invention has been completed by inclusion of a BaO component in a crystallized glass containing the respective components such as $SiO_2$, $Al_2O_3$, and $Li_2O$, and preferably controlling the content of these components within a specific range. Thus, preferred embodiments of the invention can be represented by the following constitutions.

(Constitution 1)

A crystallized glass which does not substantially contain $As_2O_3$ component (on an oxide basis) as a clarifying agent, including, in terms of percent by mass on an oxide basis:
an $SiO_2$ component between 30 and 70%,
an $Al_2O_3$ component between 10 and 40%,
a $Li_2O$ component between 0 and 10% (excluding 0%),
a $P_2O_5$ component between 5 and 15%,
a ZnO component between 0 and 5.5%, and
a BaO component between 0 and 5% (excluding 0%),
wherein the total content of the BaO component and the ZnO component (on an oxide basis) is 1% by mass or more.

(Constitution 2)

The crystallized glass according to the constitution 1, containing β-quartz and β-quartz solid solution as main crystal phase(s).

(Constitution 3)

The crystallized glass according to the constitution 1 or 2, wherein the main crystal phase has an average crystal particle size within a range between 5 and 200 nm.

(Constitution 4)

The crystallized glass according to any one of the constitutions 1 to 3, wherein an average linear thermal expansion coefficient within a temperature range between 0 and 50° C. is within a range of $0.0 \pm 1.0 \times 10^{-6}/°C$.

(Constitution 5)

The crystallized glass according to any one of the constitutions 1 to 4, including, in terms of percent by mass on an oxide basis, a $TiO_2$ component between 1 and 10% and/or a $ZrO_2$ component between 1 and 10.

(Constitution 6)

The crystallized glass according to any one of the constitutions 1 to 5, including, in terms of percent by mass on an oxide basis, an MgO component between 0 and 5%, and a CaO component between 0 and 5%.

(Constitution 7)

The $Li_2O$—$Al_2O_3$—$SiO_2$-based crystallized glass according to any one of the constitutions 1 to 6, including, in terms of percent by mass on an oxide basis, an MgO component between 0 and 5%, a CaO component between 0 and 5%, and a $P_2O_5$ component between 5 and 15%.

(Constitution 8)

The $Li_2O$—$Al_2O_3$—$SiO_2$-based crystallized glass according to any one of the constitutions 1 to 7, wherein, in terms of percent by mass on an oxide basis, a ratio of the content of the $P_2O_5$ component to that of the $SiO_2$ component is 0.02 to 0.200, and a ratio of the content of the $P_2O_5$ component to that of the $Al_2O_3$ component is 0.059 to 0.448.

The $Li_2O$—$Al_2O_3$—$SiO_2$-based crystallized glass of the present invention is capable of attaining the same clarification effect as in the composition containing an arsenic component and an antimony component even in the case of having the composition free from a component which exerts an adverse influence on the human body and environment such as an arsenic component, and maintaining various physical properties peculiar to a crystallized glass of this system.

According to a preferred embodiment of the present invention, it is also possible to obtain a $Li_2O$—$Al_2O_3$—$SiO_2$-based crystallized glass in which the average linear thermal expansion coefficient within a temperature range between 0 and 50° C. is within a range of $0.0\pm1.0\times10^{-6}$/° C.

According to a preferred embodiment of the present invention, it is also possible to obtain a crystallized glass which includes fine crystal particles having an average crystal particle size within a range between 5 and 200 nm, and which is also free from ion diffusion of PbO, $Na_2O$, and $K_2O$ components.

DETAILED DESCRIPTION OF THE INVENTION

One characteristic feature of the $Li_2O$—$Al_2O_3$—$SiO_2$-based crystallized glass is its low expansion property. This low expansion property can be obtained by imparting a specific composition to the $Li_2O$—$Al_2O_3$—$SiO_2$-based crystallized glass. The constitutive members used in the next-generation lithography technology in the production of a semiconductor by use of EUV light are required to have thermal dimensional stability, strength, thermal durability, and chemical stability, especially ultra-low expansion characteristics which are necessary for the thermal expansion stability. There is also made a study of use of such $Li_2O$—$Al_2O_3$—$SiO_2$-based crystallized glass having ultra-low expansion characteristics in the constitutive members.

In preferred embodiment, surface polishing of the $Li_2O$—$Al_2O_3$—$SiO_2$-based crystallized glass enables a smooth surface applicable to the next-generation lithography, which is also a characteristic feature of the crystallized glass.

Preferred embodiment of the crystallized glass of the present invention will be described below.

The "crystallized glass" as used herein means a material obtained by subjecting a glass to a heat treatment to precipitate a crystal in the glass phase, the material comprising an amorphous solid and a crystal.

The "(maximum value–minimum value) of ΔL/L" as used herein means a difference between a maximum value and a minimum value of ΔL/L, in which L means the length of a crystallized glass at 0° C., and ΔL means a change in length of the glass ceramics at any temperature, within any temperature range.

The "low expansion characteristics" as used herein mean that, within the temperature range between 0 and 50° C., the average linear thermal expansion coefficient (α) is within a range of $0.0\pm1.0$ ($10^{-6}$/° C.) and the (maximum value–minimum value) of ΔL/L is within a range of $10\times10^{-6}$; preferably, the average linear thermal expansion coefficient is within a range of $0.0\pm0.2$ ($10^{-6}$/° C.) and the (maximum value–minimum value) of ΔL/L is $10\times10^{-7}$ or less; and more preferably, the average linear thermal expansion coefficient is within a range of $0.0\pm0.1$ ($10'$/° C.) and the (maximum value–minimum value) of ΔL/L is $8\times10^{-7}$ or less. As used herein, the fact that the average linear thermal expansion coefficient is the value within a range of $0.0\pm0.1$ ($10^{-16}$/° C.) refers to "ultra-low expansion characteristics".

The average linear thermal expansion coefficient (α) of the crystallized glass of the present invention is within a range of $0.0\pm1.0$ ($10^{-6}$/° C.) within the temperature range between 0 and 50° C. The materials in the field of various semiconductor production devices and ultra-precision members are required to have thermal expansion characteristics capable of coping with higher accuracy. In order to satisfy the requirements, the average linear thermal expansion coefficient within the temperature range between 0 and 50° C. is controlled to fall within a range of $0.0\pm1.0$ ($10^{-7}$/° C.), preferably $0.0\pm0.5$ ($10^{-7}$/° C.), and still more preferably $0.0\pm0.1$ ($10^{-7}$/° C.). The composition of the constitutive components of the crystallized glass having a relation to physical properties is controlled to fall within the range mentioned below, whereby, the glass may easily have the physical property value a within a range of $0.0\pm0.5$ ($10^{-7}$/° C.); and when the composition is more controlled, the glass may be more easily have the physical property value a within a range of $0.0\pm0.1$ ($10^{-7}$/° C.).

Unless otherwise specified, the average linear thermal expansion coefficient as used herein is expressed as a unit of (/° C.).

Similarly, in order to satisfy high expansion characteristics of the material capable of coping with higher accuracy required, the (maximum value-minimum value) of ΔL/L within a temperature range between 0 and 50° C. is preferably controlled to fall within a range of $10\times10^{-7}$ or less. In a preferred embodiment of the crystallized glass of the present invention, the (maximum value–minimum value) of ΔL/L is controlled to $10\times10^{-7}$ or less. More preferably, the (maximum value–minimum value) of ΔL/L is controlled to $9\times10^{-7}$ or less. The crystallized glass of the present invention may easily obtain physical properties of (maximum value–minimum value) of ΔL/L of $10\times10^{-7}$ or less by controlling crystallization heat treatment conditions. It is also possible to easily obtain physical properties of (maximum value–minimum value) of ΔL/L of $9\times10^{-7}$ or less by strictly controlling crystallization heat treatment conditions, and to obtain physical properties of $8\times10^{-7}$ or less.

As used herein, the main crystal phase means all the crystal phases having a relatively large precipitation ratio. In other words, in an X-ray chart of X-ray diffractometry (wherein the vertical axis indicates the X-ray diffraction intensity, and the horizontal axis indicates the diffraction angle), when a ratio of the X-ray diffraction intensity at the main peak of a precipitation phase (the highest peak of the crystal phase) to the X-ray diffraction intensity at the main peak (the highest peak) of the crystal phase having the largest precipitation proportion, set at 100, is at least 30 (the ratio is hereinafter referred to as an X-ray intensity ratio), then all the crystal phases satisfying this are the main crystal phases. The X-ray intensity ratio of the crystal phases other than the main crystal phase is less than 20, more preferably less than 10, and most preferably less than 5.

Next, the surface roughness and precipitated crystal size after polishing will be mentioned below. In the field of various semiconductor production devices and ultra-precision members, the smoothness of the substrate surface capable of coping with higher accuracy is important. In order to maintain the smoothness, a relation between the average crystal particle size and the surface roughness should be noted. As used herein, the "average crystal particle size" is an average of the crystal particle size determined by visually measuring from a transmission electron micrograph. The number of measured values of the crystal particle size to be used for calculation of the average is 30 or more. The crystal particle size is obtained by visually measuring the longest distance between two parallel lines which sandwich the crystal particle.

When the application of the crystallized glass of the present invention to the field of various semiconductor production devices and ultra-precision members is taken into consideration, the surface roughness Ra after polishing of the glass is preferably 3 Å or less, and more preferably 2 Å or less. In order to easily obtain the smoothness, the average crystal particle size of the precipitated crystal of the material is preferably 200 nm or less, more preferably 90 nm or less, and most preferably 80 nm or less. Meanwhile, in order to make the mechanical strength of the crystallized glass fall within a desired range, the average crystal particle size is preferably 5 nm or more, more preferably 50 nm or more, and most preferably 60 nm or more. It becomes easy to obtain the value of the surface roughness Ra after polishing and the average crystal particle size, each falling within the range mentioned above by controlling the composition of the constitutive components of the crystallized glass having a relation to the precipitated crystal size to fall within a range mentioned below, and controlling the crystallization conditions.

The crystallized glass of the invention may obtain the intended low-expansion characteristics by precipitating the main crystal phase having a negative average linear thermal expansion coefficient, thus making the positive expansion coefficient of the glass phase offset the negative expansion coefficient of the crystal phase. In order to obtain ultra-low expansion characteristics, it is preferred to contain, as the main crystal phase of the crystallized glass, β-quartz (β-$SiO_2$) and/or β-quartz solid solution (β-$SiO_2$ solid solution. It becomes easy to obtain ultra-low expansion characteristics by controlling the composition of the constitutive components of the crystallized glass having a relation to the precipitated crystal phase to fall within the range mentioned below, and controlling the crystallization conditions. As used herein, the β-quartz solid solution means an interstitial one with elements other than Si and O and intercalated into β-quartz and/or a substitutional one with the elements substituted therein. Particularly preferred is a crystalline body having $Al^{3+}$ as substituted for $Si^{4+}$ and having $Li^+$, $Mg^{2+}$, and $Zn^{2+}$ added thereto for the equivalence thereof. (One typical example is β-eucryptite.)

Next, components included in the crystallized glass of the present invention are mentioned. Unless otherwise specified, each component is a component expressed on an oxide basis, and the content of each component is expressed in terms of % by mass on an oxide basis.

As used herein, "on an oxide basis" means a method of expressing the constitutive component in the crystallized glass of the present invention, when components to be used as the constitutive components of the crystallized glass of the present invention are presumed to be all decomposed into their oxides during the step of melting the glass material. Regarding its content, each constitutive component of the crystallized glass is expressed in terms of percent by mass on an oxide basis relative to the total weight of the expressed oxides, 100% by mass, in the crystallized glass.

As mentioned above, the $Li_2O$—$Al_2O_3$—$SiO_2$-based crystallized glass containing a $SiO_2$ component, an $Al_2O_3$ component, and a $Li_2O$ component of the present invention is capable of attaining the same high clarification effect as in the composition containing an $As_2O_3$ component by inclusion of a BaO component, while maintaining the above-mentioned characteristic feature.

The BaO component basically remains in the glass matrix other than the crystals precipitated in the glass, thereby exerting some influences on the effect of improving the ultra-low-expansion characteristics and the meltability of the glass, and exerting the clarification effect; and is an essential component for delicate control of the relative amount of the crystal phase and the glass matrix phase.

When the content of the BaO component is 0% or more (excluding 0%) and 5% or less, low expansion characteristics are remarkably improved, and it is possible to easily obtain ultra-low expansion characteristics and to obtain high clarification effect. In addition, devitrification resistance of the glass material is more improved and coarsening of the precipitated crystal in the crystallized glass after the crystallization stage due to deterioration of the devitrification resistance is suppressed, thus increasing mechanical strength.

In order to more easily obtain the effect, the lower limit of the content is preferably 0.3% or less, more preferably 0.5%, still more preferably 0.9%, and yet preferably 1.0%.

Meanwhile, in order to more easily attain the effect, the upper limit of the content is more preferably 4%, still more preferably 3.5%, and most preferably 3%.

In order to include the BaO component, $Ba(NO_3)_2$, $BaSO_4$, and the like can be used as the glass material.

In order to attain a high clarification effect while maintaining low expansion characteristics, it is possible to contain, in addition to the BaO component, the ZnO component. The ZnO component is a component which may be easily the constitutive elements of β-quartz solid solution. When combined with a predetermined amount of a $SiO_2$ component and a $P_2O_5$ component, the ZnO component is effective for improving the low-expansion property of the crystallized glass and for reducing the deformation thereof at high temperature. Also, the ZnO component is effective for significantly improving meltability and clarity of the glass material and may be optionally contained in the present invention.

In the case of containing the ZnO component, when the content of the ZnO component is 5.5% or less, low expansion characteristics are remarkably improved, thus making it possible to easily obtain ultra-low expansion characteristics. In addition, devitrification resistance of the glass material is more improved and coarsening of the precipitated crystal in the glass ceramics after the crystallization stage due to deterioration of the devitrification resistance is suppressed, thus mechanical strength is increased.

In order to more easily attain the effect, the lower limit of the content is preferably 0.1%, more preferably 0.2%, still more preferably 0.3%, and most preferably 0.4%.

Meanwhile, in order to more easily attain the effect, the upper limit of the content is more preferably 4%, still more preferably 3%, and most preferably 2.6%.

In order to include the ZnO component, ZnO, $ZnSO_4$, and the like can be used as the glass material.

In order to improve meltability and defoaming property of the glass, in the present invention, the total content of the BaO component and the ZnO component (on an oxide basis) is preferably 1% or more, more preferably 1.5% or more, and still more preferably 2.0% or more. The reason is that this total content causes a decrease in viscosity of the glass, thus making it easy to melt the glass and to cause defoaming. Also, the total content is controlled within the above range so as to attain a high clarification effect in the present invention.

Meanwhile, excess total content of the BaO component and the ZnO component may cause deterioration of devitrification resistance and deterioration of low expansion property. Therefore, the total content of the BaO component and the ZnO component (on an oxide basis) in the present invention is preferably 5.5% or less, more preferably 5% or less, and still more preferably 4% or less.

The SiO$_2$ component is a component associated with the case where R-quartz and/or β-quartz solid solution is/are precipitated as the main crystal phase by a heat treatment of the glass material. In the present invention, the content of the SiO$_2$ component is 30% or more and 70% or less.

When the content of the SiO$_2$ component is 30% or more, the precipitated crystal of the obtained crystallized glass is stabilized and its structure is less likely to be coarsened, thus improving the mechanical strength, leading to a decrease in surface roughness after polishing. In order to more easily obtain the effect, the lower limit of the content is more preferably 45%, still more preferably 51%, and most preferably 53%.

Meanwhile, when the content of the SiO$_2$ component is 70% or less, meltability and shapability of the glass material is enhanced and also homogeneousness is improved. In order to more easily attain the effect, the upper limit of the content is preferably 65%, more preferably 60%, and most preferably 58%.

In order to include the SiO$_2$ component, SiO$_2$, ZrSiO$_4$, and the like can be used as the glass material.

When the amount of the Al$_2$O$_3$ component is 10% or more, the glass material is easily melted, thus improving homogeneousness of the obtained crystallized glass and chemical durability of the crystallized glass. In order to more easily attain the effect, the lower limit of the content is more preferably 20%, and most preferably 22%.

Meanwhile, when the amount of the Al$_2$O$_3$ component is 40% or less, devitrification resistance of the glass material is improved and the structure of the crystallized glass is prevented from being coarsened during the crystallization stage due to deterioration of the devitrification resistance, leading to an increase in mechanical strength. In order to more easily attain the effect, the upper limit of the content is preferably 30%, more preferably 27%, and most preferably 26%.

In order to include the Al$_2$O$_3$ component, Al$_2$O$_3$, Al(PO$_3$)$_3$, Al(OH)$_3$, and the like can be used as the glass material.

The P$_2$O$_5$ component has the effect of improving the meltability and clarity of the glass material, and the effect of stabilizing the thermal expansion after the heat treatment for crystallization to be a desired value. The effect may be more enhanced by combining with the SiO$_2$ component. In the crystallized glass of the present invention, when the amount of the P$_2$O$_5$ component is 5% or more, the above effect is remarkably improved. In order to more easily attain the effect, the lower limit of the content is preferably 5%, more preferably 5.5%, and most preferably 6%.

Meanwhile, when the amount of the P$_2$O$_5$ component is 15% or less, devitrification resistance of the glass material is improved and the structure of the glass ceramics is prevented from being coarsened during the crystallization stage due to deterioration of the devitrification resistance, leading to an increase in mechanical strength. In order to more easily attain the effect, the upper limit of the content is more preferably 13%, still more preferably 10%, and most preferably 9%.

In order to include the P$_2$O$_5$ component, Al(PO$_3$)$_3$, Ba(PO$_3$)$_2$, and the like can be used as the glass material.

The total content of the SiO$_2$ component, the Al$_2$O$_3$ component, and the P$_2$O$_5$ component is preferably 65 to 93% (SiO$_2$+Al$_2$O$_3$+P$_2$O$_5$=65 to 93%). A ratio of the content of the P$_2$O$_5$ component to that of the SiO$_2$ component (P$_2$O$_5$/SiO$_2$) is preferably 0.02 to 0.200. A ratio of the content of the P$_2$O$_5$ component to that of the Al$_2$O$_3$ component (P$_2$O$_5$/Al$_2$O$_3$) is preferably 0.059 to 0.448. If any one of these conditions is satisfied, or two or more conditions are satisfied, it becomes easy to significantly improve low expansion characteristics at temperature range of 0 to 50° C., thus making it possible to easily obtain ultra-low expansion characteristics.

In order to more easily attain the effect, the lower limit of the total content of SiO$_2$, Al$_2$O$_3$, and P$_2$O$_5$ is more preferably 75%, still more preferably 80%, and most preferably 82%. Meanwhile, in order to more easily attain the effect, the upper limit of the total content of SiO$_2$, Al$_2$O$_3$, and P$_2$O$_5$ is more preferably 91%, and most preferably 89%.

In order to more easily attain the effect, the lower limit of P$_2$O$_5$/SiO$_2$ is more preferably 0.08, and most preferably 0.12. Meanwhile, in order to more easily obtain the effect, the upper limit of OP 0/SiO$_2$ is more preferably 0.18, still more preferably 0.16, and most preferably 0.14.

In order to more easily attain the effect, the lower limit of P$_2$O$_5$/Al$_2$O$_3$ is more preferably 0.150, still more preferably 0.210, and most preferably 0.250. Meanwhile, in order to more easily attain the effect, the upper limit of P$_2$O$_5$/Al$_2$O$_3$ is more preferably 0.400, still more preferably 0.380, and most preferably 0.350.

The Li$_2$O or MgO component is a component which may be easily the constitutive elements of β-quartz solid solution.

When combined with a SiO$_2$ component and a P$_2$O$_5$ component in the above composition range, the Li$_2$O or MgO component is effective for improving the low-expansion property of the crystallized glass and for reducing the deformation thereof at high temperature. Also, the Li$_2$O or MgO component is effective for significantly improving meltability and clarity of the glass material. The glass can optionally contain each of these components in the case of expecting to easily obtain the effect, and it is particularly preferred to contain 0% or more (excluding 0%) of the Li$_2$O component.

It is more preferred that the amount of the Li$_2$O component is 1% or more since the effect is remarkably improved and also meltability of the glass material is improved, whereby, homogeneousness is improved and also precipitation of β-quartz or β-quartz solid solution is remarkably improved. In order to more easily attain the effect, the lower limit of the content is more preferably 2%, and most preferably 3%.

Meanwhile, when the content of the Li$_2$O component is 10% or less, ultra-low expansion characteristic can be easily obtained by remarkably improving low expansion characteristics. Also, devitrification resistance of the glass material is more improved, whereby, coarsening of the precipitated crystal in the crystallized glass after the crystallization stage due to deterioration of the devitrification resistance is suppressed, thus increasing mechanical strength. In order to make it easier to attain the effect, the upper limit of the content is more preferably 8%, still more preferably 6%, yet preferably 5%, and most preferably 4.6%.

In order to include the Li$_2$O component, Li$_2$CO$_3$, Li$_2$SO$_4$, and the like can be used as the glass material.

The MgO component is a component which can be optionally added so as to attain the effect. When the amount of the MgO component to be added is 0.1% or more, the effect is remarkably improved. In order to more easily attain the effect, the lower limit of the content is more preferably 0.4%, still more preferably 0.5%, and most preferably 0.7%.

Meanwhile, when the content of the MgO component is 5% or less, low expansion characteristics are remarkably improved, thus making it possible to obtain ultra-low expansion characteristics. In order to more easily attain the effect, the upper limit of the content is more preferably 3%, and most preferably 2%.

In order to contain the MgO component, MgO, MgSO$_4$, and the like can be used as the glass material.

The CaO component basically remains in the glass matrix other than the crystals precipitated in the glass, thereby exerting some influences on the effect of improving the ultra-low-expansion characteristics and the meltability of the glass, and capable of being optionally contained as the component for delicate control of the relative amount of the crystal phase to the glass matrix phase. It is also possible to attain the melt clarification effect by containing more than 0% of the CaO component, and melt clarification effect can be remarkably attained when the amount is 0.3% or more. In order to more easily attain the effect, the lower limit of the content of the CaO component is most preferably 0.5%.

Meanwhile, when the content of the CaO component is 5% or less, low expansion characteristics are remarkably improved, thus easily attaining ultra-low expansion characteristics. Also, devitrification resistance of the glass material is more improved, whereby, coarsening of the precipitated crystal in the crystallized glass after the crystallization stage due to deterioration of the devitrification resistance is suppressed, thus increasing mechanical strength. In order to more easily attain the effect, the upper limit of the content of the CaO component is more preferably 3%.

In order to include the CaO component, $CaCO_3$, $CaSO_4$, and the like can be used as the glass material.

The $TiO_2$ component and the $ZrO_2$ component are both components useful as a crystal nucleating agent. In the present invention, when 1% or more and 10% or less of at least either one of the $TiO_2$ component or the $ZrO_2$ component is contained, the objective crystal phase is easily precipitated and also no unmolten substance is generated, which leads to satisfactory meltability of the glass material and an improvement in homogeneousness.

In order to more easily attain the effect (to enable precipitation of the objective crystal phase), the lower limit of the content of $TiO_2$ is preferably 1%, more preferably 1.3%, and most preferably 1.5%. The lower limit of the content of $ZrO_2$ is preferably 1%, more preferably 1.2%, and most preferably 1.5%. The lower limit of the total content of the $TiO_2$ component and the $ZrO_2$ component is preferably 1%, more preferably 1.5%, still more preferably 2.0%, and most preferably 2.5%.

Meanwhile, in order to more easily attain the effect (no unmolten substance is generated, which leads to satisfactory meltability of the glass material and an improvement in homogeneousness), the upper limit of the content of $TiO_2$ is preferably 10%, more preferably 7%, still more preferably 5%, and most preferably 4%. For the same reason, the upper limit of the content of $ZrO_2$ is preferably 10%, more preferably 7%, still more preferably 5%, and most preferably 4%. The total upper limit of the content of the $TiO_2$ component and the $ZrO_2$ component is preferably 10%, more preferably 7%, still more preferably 5%, and most preferably 4%.

In order to contain the $TiO_2$ component, $TiO_2$, and the like can be used as the glass material.

In order to contain the $ZrO_2$ component, $ZrO_2$, $ZrSiO_4$, and the like can be used as the glass material.

The $As_2O_3$ component is a component capable of becoming environmentally harmful, and it should not be substantially included. Since the crystallized glass of the present invention is capable of attaining the clarification effect without including the $As_2O_3$ component, it is preferred that the crystallized glass does not substantially contain the $As_2O_3$ component so as to reduce an adverse influence on the environment.

The $Sb_2O_3$ is also a component capable of becoming environmentally harmful, and its use must be reduced as much as possible. Since the crystallized glass of the present invention is capable of attaining the clarification effect without containing the $Sb_2O_3$ component, it is preferred that the crystallized glass does not substantially contain the $Sb_2O_3$ component so as to reduce an adverse influence on the environment.

In addition to the above-mentioned components, the crystallized glass of the present invention may further contain one, or two or more of other components such as SrO, $B_2O_3$, $F_2$, $La_2O_3$, $Bi_2O_3$, $WO_3$, $Y_2O_3$, and $Gd_2O_3$ in the total amount of 5% or less, and may also contain one, or two or more of coloring components such as CoO, NiO, $MnO_2$, $Fe_2O_3$, and $Cr_2O_3$ in the total amount of 5% or less, for the purpose of delicate control of the characteristics of the glass without impairing the characteristics thereof. However, when the crystallized glass of the present invention is used for applications which require high light transmittance, it is preferred that the crystallized glass does not contain the above-mentioned coloring components.

In the present invention, it is possible to further contain the fluoride component and the sulfate component, optionally, in expectation of the additional clarification effect. In the melting process of the glass, a decomposition gas is generated from the fluoride component and the sulfate component and the decomposition gas is combined with other gasses (bubbles) in the molten glass to form large bubbles which are likely to float on the surface, thus improving the property of removing the bubbles in the molten glass.

For example, $MgF_2$ and $CaF_2$ can be added as the fluoride component, and $BaSO_4$, $Li_2SO_4$, and $ZnSO_4$ can be added as the sulfate component. In order to attain the clarification effect due to these components, the lower limit of the total additive amount of the fluoride component as $F_2$ and the sulfate component as $SO_3$ is preferably 0.03 part by weight, and more preferably 0.05 part by weight, relative to 100 parts by weight of the composition other than these components on an oxide basis. Meanwhile, the upper limit of the total additive amount of these components is sufficiently 2 parts by weight, more preferably 1 part by weight, and most preferably 0.1 part by weight.

In order to attain the clarification effect due to these components, the lower limit of each additive amount of these components is preferably 0.03 part by weight, and more preferably 0.05 part by weight. Meanwhile, in order to attain the effect, the upper limit of each additive amount of the above components is preferably 2 parts by weight, more preferably 1 part by weight, and most preferably 0.1 part by weight.

In the present invention, it is possible to further contain one, or two or more of a $MnO_2$ component, a $WO_3$ component, a $Ta_2O_5$ component, and an $Nb_2O_5$ component, optionally, in expectation of the additional clarification effect.

In order to attain the clarification effect, the lower limit of the total content of the $MnO_2$ component, the $WO_3$ component, the $Ta_2O_5$ component, and the $Nb_2O_5$ component is more preferably 0.05%, and most preferably 0.2%. Meanwhile, the upper limit of the total content of these components is sufficiently 5%, more preferably 3%, and most preferably 1.5%.

In order to attain the clarification effect, the lower limit of the content of these components is more preferably 0.05%, and most preferably 0.2%. Meanwhile, in order to attain the effect, the upper limit of each content of these components is preferably 5%, more preferably 2%, and most preferably 1.5%.

In the present invention, it is preferred that the glass contain neither a $CeO_2$ component nor a $SnO_2$ component. When the glass contains the $CeO_2$ component, defoaming may not be sufficiently performed and the crystallized glass may undergo coloration in the production of the crystallized glass. When the glass contains $SnO_2$, the crystallized glass may undergo devitrification and the crystallized glass may undergo coloration, and also deterioration of members used in the production process may proceed.

Particularly, when the crystallized glass is intended to obtain ultra-low expansion characteristics, a main crystal phase having a negative average linear thermal expansion coefficient is precipitated in the glass, and combined with the glass matrix phase having a positive average linear thermal expansion coefficient, thereby realizing ultra-low expansion characteristics as a whole. For this, it is preferred that the glass does not contain a crystal phase having a positive average linear thermal expansion coefficient, that is, lithium disilicate, lithium silicate, α-quartz, α-cristobalite, α-tridymite, petalite including Zn-petalite, wollastonite, forsterite, diopsite, nepheline, clinoenstatite, anorthite, celsian, gehlenite, feldspar, willemite, mullite, corundum, rankinite, larnite, and solid solutions thereof. In addition to these, it is also preferred that the glass does not contain tungstates such as Hf tungstate and Zr tungstate, titanates such as magnesium titanate, barium titanate and manganese titanate, and mullite, 2-barium 3-silicate, $Al_2O_3.5SiO_2$, and solid solutions thereof, so as to maintain satisfactory mechanical strength thereof.

Next, the crystallized glass of the present invention is produced by the following method. First, glass materials are weighed, formulated, put into a crucible or the like, and then melted at about 1,450 to 1,600° C. to obtain a glass material.

The glass material is preferably mixed with a clarifying agent for defoaming of the glass. The fluoride component, the sulfate component, and the chloride component can be used as the defoaming agent. It is particularly preferred to mix one or more defoaming agents selected from $BaSO_4$, $Li_2SO_4$ and $ZnSO_4$. Mixing of the raw material with one or more clarifying agents selected from $BaSO_4$, $Li_2SO_4$, and $ZnSO_4$ enables attainment of high defoaming effect without using the clarifying agent, which has often been used heretofore, such as $As_2O_3$ and $Sb_2O_3$, and also attainment of desired ultra-low expansion characteristics in the crystallized glass.

When the amount of $BaSO_4$ to be mixed in the raw material is 0.02% by mass or more based on the mass of the whole glass material containing $BaSO_4$, the defoaming effect can be attained. Therefore, the lower limit of the amount of $BaSO_4$ to be mixed in the raw material is preferably 0.02% by mass, more preferably 0.03% by mass, and most preferably 0.035% by mass.

Meanwhile, when the amount of $BaSO_4$ to be mixed in the raw material is more than 2% by mass based on the mass of the whole glass material containing $BaSO_4$, excessive foaming occurs and bubbles are likely to remain in the melt of the glass material, thus making it impossible to attain the desired defoaming effect. Therefore, the upper limit of the amount of $BaSO_4$ to be mixed in the raw material is preferably 2% by mass, more preferably 1.9% by mass, and most preferably 1.8% by mass.

When the amount of $Li_2SO_4$ to be mixed in the raw material is 0.1% by mass or more based on the mass of the whole glass material containing $Li_2SO_4$, the defoaming effect can be attained. Therefore, the lower limit of the amount of $Li_2SO_4$ to be mixed in the raw material is preferably 0.15% by mass, more preferably 0.2% by mass, and most preferably 0.3% by mass.

Meanwhile, the amount of $Li_2SO_4$ to be mixed in the raw material is more than 2% by mass based on the mass of the whole glass material containing $Li_2SO_4$, excessive foaming occurs and bubbles are likely to remain in the melt of the glass material, thus making it impossible to attain the desired defoaming effect. Therefore, the upper limit of the amount of $Li_2SO_4$ to be mixed in the raw material is preferably 1.9% by mass, more preferably 1.8% by mass, and most preferably 1.7% by mass.

When the amount of $ZnSO_4$ to be mixed in the raw material is 0.05% by mass or more based on the mass of the whole glass material containing $ZnSO_4$, the defoaming effect can be attained. Therefore, the lower limit of the amount of $ZnSO_4$ to be mixed in the raw material is preferably 0.06% by mass, more preferably 0.07% by mass, and most preferably 0.08% by mass.

Meanwhile, the amount of $ZnSO_4$ to be mixed in the raw material is more than 1.5% by mass based on the mass of the whole glass material containing $ZnSO_4$, excessive foaming occurs and bubbles are likely to remain in the melt of the glass material, thus making it impossible to attain the desired defoaming effect. Therefore, the upper limit of the amount of $ZnSO_4$ to be mixed in the raw material is preferably 1.0% by mass, more preferably 0.8% by mass, and most preferably 0.7% by mass.

The lower limit of the total amount of one or more defoaming agents selected from $BaSO_4$, $Li_2SO_4$, and $ZnSO_4$ to be mixed in the raw material is preferably 0.02% by mass, more preferably 0.03% by mass, and most preferably 0.035% by mass, based on the mass of the whole glass material from the viewpoint of attaining the defoaming effect.

Meanwhile, the upper limit of the total amount of one or more defoaming agents selected from $BaSO_4$, $Li_2SO_4$, and $ZnSO_4$ to be mixed in the raw material is preferably 2% by mass, more preferably 1.9% by mass, and most preferably 1.8% by mass, based on the mass of the whole glass material from the viewpoint of suppressing excessive foaming to attain the desired defoaming effect.

As mentioned above, the glass material is melted, cast into a mold and/or hot-shaped into a desired form, and then slowly cooled.

Next, the glass material is subjected to a heat treatment for converting into a crystallized glass. First, it is maintained at a temperature of 650 to 750° C., thereby promoting formation of crystal nuclei. The temperature of the heat treatment is more preferably controlled to 680° C. as the lower limit, and the heat treatment is more preferably controlled to 720° C. as the upper limit. After forming crystal nuclei, crystallization is conducted at a temperature of 750 to 850° C. When the temperature is lower than 750° C., the main crystal phase could not fully grow and, when it is higher than 850° C., it is undesirable since the glass material is likely to cause softening and deforming or re-melting.

Further, a mask, an optical reflection mirror, a wafer stage, a reticular stage, and a precision member can be obtained by forming the obtained glass ceramics into desired forms, followed by optional forming such as lapping, polishing, and film formation thereon.

Next, preferred Examples of the present invention will be described below.

In Tables 1 to 6, each glass composition and number of bubbles remaining per 1 $cm^3$ of the glass after melting of Examples 1 to 16, and Comparative Examples 1 and 2 are shown. In Tables 7 to 11, each composition of the glass materials of Example 1 to 16 is shown. The composition of the glass material represents % by mass of each raw material relative to 100% by mass of the whole glass material. In Comparative Example 1, the arsenic component is contained so as to exert the clarification effect. In Comparative Examples, none of $BaSO_4$, $Li_2SO_4$, and $ZnSO_4$ is mixed in the glass material. Bubbles as used herein are bubbles having a diameter (φ) of 10 μm or more. Light transmittance wavelength at a thickness of 10 mm (values at 5% and 80%) is shown in Tables 1, 2, 5, and 6, and an average linear thermal expansion coefficient (α) at 0 to 50° C. is shown in Tables 1 to 6. Each composition of the respective Examples and Comparative Examples were expressed by % by mass. The present invention is not limited only to the following Examples.

According to the formulation of raw materials shown in Tables 7 to 11, raw materials of oxide, carbonate, sulfide, and nitrate were mixed and melted using a common melting device at a temperature of about 1,450 to 1,600° C. After stirring for homogenization, the resulting melt mixture was shaped and cooled to obtain a glass material (amorphous glass). The glass material was then subjected to a heat treatment at 650 to 750° C. for about 1 to 150 hours to form crystal nuclei, which was crystallized by subjecting to a heat treatment at 750 to 850° C. for about 1 to 300 hours to obtain a crystallized glass.

The number of bubbles remaining is an average of the number of bubbles at five positions in the case of counting the number of bubbles including a thickness direction with respect to optional five positions (plane measuring 1 cm²×5) of a square surface of the glass material (square measuring 100 mm on a side, and 10 mm in thickness) using a stereoscopic microscope (SZ60, manufactured by OLYMPUS CORPORATION).

A crystallized glass made from the glass material after the measurement of the number of bubbles remaining, and an average linear thermal expansion coefficient ($\alpha$) at 0 to 50° C. with respect to the crystallized glass was measured.

The average linear thermal expansion coefficient was measured using a Fizeau interferometry-type accurate expansion coefficient measuring apparatus. The measuring sample has a cylindrical shape having a diameter of 6 mm and a length of about 80 mm. An optical flat plate is brought into contact with both ends of a measuring sample, thereby enabling observation of interference fringes by a He—Ne laser, and then the sample is put in a temperature controllable furnace. Next, the temperature of the measuring sample is changed and a change in interference fringes is observed to measure a change in length of the measuring sample depending on the temperature. In the present invention, after temperature rising or falling at 0.5° C./min in the temperature range of 0 to 50° C., an amount of a change in measuring sample length was plotted every 5 seconds and a quintic approximation curve was drawn, and then an average linear thermal expansion coefficient from 0 to 50° C., and (maximum value−minimum value) of $\Delta L/L$ in the temperature range of 0 to 50° C. were measured. Both the average linear thermal expansion coefficient and the (maximum value−minimum value) of the $\Delta L/L$− temperature curve are averages during temperature rising and falling.

With respect to the obtained glass material and crystallized glass, a refractive index (nd) and an Abbe number (vd) were measured according to Japan Optical Glass Industrial Standard JOGIS 2003-01, and a light transmittance (wavelength for 80% light transmittance $\lambda_{80}$ and wavelength for 5% light transmittance $\lambda_5$) was measured according to JOGIS 2003-02, and then a specific gravity was measured according to JOGIS 1975-05.

As shown in Tables 1 to 5, in the crystallized glasses of Examples, regarding high expansion characteristics, an average linear thermal expansion coefficient at 0 to 50° C. was within 0.0±1.0 ($10^{-6}$/° C.). Especially in Examples 1 to 4 and 17 to 20, since the number of bubbles remaining in 1 cm³ of the crystallized glass is less than 2, and also an average linear thermal expansion coefficient ($\alpha$) is within 0.0±0.5 ($10^{-7}$/° C.) in the temperature range of 0 to 50° C., they exhibit clarity and ultra-low expansion characteristics corresponding to the results when using the arsenic component in Comparative Example 1 shown in Table 6.

Like Comparative Example 2 shown in Table 6, when the total content of the BaO component and the ZnO component (on an oxide basis) is less than 1%, the number of bubbles remaining in 1 cm³ of the glass is 33, and thus it is considered that the glass has no clarity.

TABLE 1

| | | Examples | | | |
|---|---|---|---|---|---|
| | Sample | 1 | 2 | 3 | 4 |
| Composition [% by mass] | $SiO_2$ | 55.500 | 55.500 | 55.500 | 55.500 |
| | $Al_2O_3$ | 24.500 | 24.500 | 24.500 | 24.500 |
| | $P_2O_5$ | 7.500 | 7.500 | 7.500 | 7.500 |
| | $Li_2O$ | 3.800 | 3.800 | 3.800 | 3.800 |
| | MgO | 1.000 | 1.000 | 1.000 | 1.000 |
| | CaO | 1.050 | 1.050 | 1.050 | 1.050 |
| | BaO | 1.100 | 1.200 | 1.500 | 1.470 |
| | ZnO | 1.250 | 1.150 | 0.850 | 0.880 |
| | $ZrO_2$ | 2.000 | 2.000 | 2.000 | 2.000 |
| | $TiO_2$ | 2.300 | 2.300 | 2.300 | 2.300 |
| | $As_2O_3$ | — | — | — | — |
| | Total | 100.000 | 100.000 | 100.000 | 100.000 |
| | BaO + ZnO | 2.35 | 2.35 | 2.35 | 2.35 |
| | $SiO_2 + Al_2O_3 + P_2O_5$ | 87.500 | 87.500 | 87.500 | 87.500 |
| | $P_2O_5/SiO_2$ | 0.135 | 0.135 | 0.135 | 0.135 |
| | $P_2O_5/Al_2O_3$ | 0.306 | 0.306 | 0.306 | 0.306 |
| | $TiO_2 + ZrO_2$ | 4.300 | 4.300 | 4.300 | 4.300 |
| Number of bubbles remaining (bubbles/cm³) | | 0.8 | 0.2 | 0.4 | 0.4 |
| Amorphous glass | nd | 1.52882 | 1.52868 | 1.52827 | 1.52852 |
| | vd | 57.4 | 58.6 | 58.6 | 57.7 |
| | Wavelength for 80% transmittance (nm) | 373 | 374 | 372 | 372 |
| | Wavelength for 5% transmittance (nm) | 326 | 325 | 325 | 325 |
| | Specific gravity | 2.47 | 2.47 | 2.47 | 2.47 |
| Crystallized glass | nd | 1.54373 | 1.54329 | 1.54237 | 1.54238 |
| | vd | 55.8 | 56.1 | 56.1 | 56.0 |
| | Wavelength for 80% transmittance (nm) | 482 | 480 | 484 | 488 |
| | Wavelength for 5% transmittance (nm) | 379 | 378 | 380 | 379 |
| | Specific gravity | 2.54 | 2.54 | 2.53 | 2.53 |
| | $\alpha$(0° C. to 50° C.) ($\times 10^{-7}$/° C.) | −0.50 | −0.32 | 0.50 | 0.44 |

TABLE 2

|  |  | Examples | | | |
| --- | --- | --- | --- | --- | --- |
| Sample |  | 5 | 6 | 7 | 8 |
| Composition [% by mass] | $SiO_2$ | 55.800 | 55.900 | 56.400 | 55.900 |
|  | $Al_2O_3$ | 24.600 | 24.700 | 24.700 | 24.700 |
|  | $P_2O_5$ | 7.500 | 7.600 | 7.600 | 7.600 |
|  | $Li_2O$ | 3.800 | 3.900 | 3.800 | 4.000 |
|  | MgO | 1.000 | 1.000 | 0.900 | 1.000 |
|  | CaO | 1.100 | 0.800 | 0.500 | 1.000 |
|  | BaO | 1.400 | 1.050 | 1.150 | 0.950 |
|  | ZnO | 0.500 | 0.850 | 0.950 | 0.550 |
|  | $ZrO_2$ | 2.000 | 2.000 | 2.000 | 2.000 |
|  | $TiO_2$ | 2.300 | 2.200 | 2.000 | 2.300 |
|  | $As_2O_3$ | — | — | — | — |
|  | Total | 100.000 | 100.000 | 100.000 | 100.000 |
|  | BaO + ZnO | 1.90 | 1.90 | 2.10 | 1.50 |
|  | $SiO_2 + Al_2O_3 + P_2O_5$ | 87.900 | 88.200 | 88.700 | 88.200 |
|  | $P_2O_5/SiO_2$ | 0.134 | 0.136 | 0.135 | 0.136 |
|  | $P_2O_5/Al_2O_3$ | 0.305 | 0.308 | 0.308 | 0.308 |
|  | $TiO_2 + ZrO_2$ | 4.300 | 4.200 | 4.000 | 4.300 |
|  | Number of bubbles remaining (bubbles/$cm^3$) | 1.5 | 1.5 | 0.2 | 2.0 |
| Amorphous glass | nd | 1.52755 | 1.52697 | 1.52476 | 1.52748 |
|  | vd | 58.0 | 57.8 | 57.7 | 57.7 |
|  | Wavelength for 80% transmittance (nm) | 378 | 379 | 377 | 381 |
|  | Wavelength for 5% transmittance (nm) | 327 | 327 | 325 | 329 |
|  | Specific gravity | 2.46 | 2.46 | 2.45 | 2.46 |
| Crystallized glass | nd | 1.54196 | 1.54251 | 1.53908 | 1.54298 |
|  | vd | 55.9 | 55.8 | 56.9 | 55.8 |
|  | Wavelength for 80% transmittance (nm) | 488 | 482 | 610 | 473 |
|  | Wavelength for 5% transmittance (nm) | 380 | 379 | 379 | 380 |
|  | Specific gravity | 2.53 | 2.53 | 2.52 | 2.53 |
|  | $\alpha$(0° C. to 50° C.) ($\times 10^{-7}$/° C.) | 0.90 | -0.90 | -2.00 | -0.42 |

TABLE 3

|  |  | Examples | | | |
| --- | --- | --- | --- | --- | --- |
| Sample |  | 9 | 10 | 11 | 12 |
| Composition [% by mass] | $SiO_2$ | 50.500 | 54.500 | 56.400 | 55.560 |
|  | $Al_2O_3$ | 26.250 | 26.000 | 23.600 | 26.250 |
|  | $P_2O_5$ | 6.050 | 8.100 | 8.000 | 6.080 |
|  | $Li_2O$ | 3.550 | 3.400 | 3.300 | 3.950 |
|  | MgO | 5.000 | 1.400 | 0.720 | 1.400 |
|  | CaO | 0.050 | 1.500 | 0.620 | 1.620 |
|  | BaO | 2.550 | 1.200 | 3.050 | 1.520 |
|  | ZnO | 2.550 | 0.400 | 0.620 | 1.000 |
|  | $ZrO_2$ | 2.000 | 1.300 | 2.250 | 1.000 |
|  | $TiO_2$ | 1.500 | 2.200 | 1.440 | 1.620 |
|  | Total | 100.000 | 100.000 | 100.000 | 100.000 |
|  | BaO + ZnO | 5.10 | 1.60 | 3.67 | 2.52 |
|  | $SiO_2 + Al_2O_3 + P_2O_5$ | 82.800 | 88.600 | 88.000 | 87.890 |
|  | $P_2O_5/SiO_2$ | 0.120 | 0.149 | 0.142 | 0.109 |
|  | $P_2O_5/Al_2O_3$ | 0.230 | 0.312 | 0.339 | 0.232 |
|  | $TiO_2 + ZrO_2$ | 3.500 | 3.500 | 3.690 | 2.620 |
|  | Number of bubbles remaining (bubbles/$cm^3$) | 1.2 | 1.4 | 1.8 | 1.4 |
|  | $\alpha$(0° C. to 50° C.) ($\times 10^{-7}$/° C.) | 7.6 | 7.5 | 1.7 | 1.05 |

TABLE 4

|  |  | Examples | | | |
| --- | --- | --- | --- | --- | --- |
| Sample |  | 13 | 14 | 15 | 16 |
| Composition [% by mass] | $SiO_2$ | 56.000 | 58.600 | 59.600 | 50.800 |
|  | $Al_2O_3$ | 25.000 | 22.200 | 23.230 | 23.950 |
|  | $P_2O_5$ | 6.000 | 5.050 | 5.050 | 9.050 |
|  | $Li_2O$ | 4.500 | 3.030 | 4.550 | 3.700 |
|  | MgO | 1.000 | 1.010 | 1.200 | 1.800 |
|  | CaO | 0.500 | 0.510 | 0.800 | 2.550 |
|  | BaO | 1.000 | 3.030 | 1.200 | 2.550 |
|  | ZnO | 1.000 | 2.020 | 0.800 | 1.000 |
|  | $ZrO_2$ | 1.500 | 2.020 | 1.520 | 3.500 |
|  | $TiO_2$ | 3.500 | 2.530 | 2.050 | 1.100 |
|  | Total | 100.000 | 100.000 | 100.000 | 100.000 |
|  | BaO + ZnO | 2.00 | 5.05 | 2.00 | 3.55 |
|  | $SiO_2 + Al_2O_3 + P_2O_5$ | 87.000 | 85.850 | 87.880 | 83.800 |
|  | $P_2O_5/SiO_2$ | 0.107 | 0.086 | 0.085 | 0.178 |
|  | $P_2O_5/Al_2O_3$ | 0.240 | 0.227 | 0.217 | 0.378 |
|  | $TiO_2 + ZrO_2$ | 5.000 | 4.550 | 3.570 | 4.600 |
|  | Number of bubbles remaining (bubbles/$cm^3$) | 1.4 | 2.0 | 2.4 | 1.2 |
|  | $\alpha$(0° C. to 50° C.) ($\times 10^{-7}$/° C.) | -1.28 | 0.66 | -2.4 | 8.4 |

TABLE 5

| | Sample | Examples | | | |
|---|---|---|---|---|---|
| | | 17 | 18 | 19 | 20 |
| Composition [% by mass] | $SiO_2$ | 55.500 | 55.500 | 55.500 | 55.500 |
| | $Al_2O_3$ | 24.500 | 24.500 | 24.500 | 24.500 |
| | $P_2O_5$ | 7.500 | 7.500 | 7.500 | 7.500 |
| | $Li_2O$ | 3.800 | 3.800 | 3.800 | 3.800 |
| | MgO | 1.000 | 1.000 | 1.000 | 1.000 |
| | CaO | 1.050 | 1.050 | 1.050 | 1.050 |
| | BaO | 1.100 | 1.100 | 1.100 | 1.100 |
| | ZnO | 1.250 | 1.250 | 1.250 | 1.250 |
| | $ZrO_2$ | 2.000 | 2.000 | 2.000 | 2.000 |
| | $TiO_2$ | 2.300 | 2.300 | 2.300 | 2.300 |
| | $As_2O_3$ | — | — | — | — |
| | Total | 100.000 | 100.000 | 100.000 | 100.000 |
| | BaO + ZnO | 2.350 | 2.350 | 2.350 | 2.350 |
| | $SiO_2 + Al_2O_3 + P_2O_5$ | 87.500 | 87.500 | 87.500 | 87.500 |
| | $P_2O_5/SiO_2$ | 0.135 | 0.135 | 0.135 | 0.135 |
| | $P_2O_5/Al_2O_3$ | 0.306 | 0.306 | 0.306 | 0.306 |
| | $TiO_2 + ZrO_2$ | 4.300 | 4.300 | 4.300 | 4.300 |
| | Number of bubbles remaining (bubbles/cm³) | 0.5 | 0.9 | 0.6 | 0.8 |
| Amorphous glass | nd | 1.52872 | 1.52881 | 1.52879 | 1.52885 |
| | vd | 57.4 | 57.4 | 57.4 | 57.4 |
| | Wavelength for 80% transmittance (nm) | 372 | 373 | 374 | 373 |
| | Wavelength for 5% transmittance (nm) | 325 | 326 | 325 | 326 |
| | Specific gravity | 2.47 | 2.47 | 2.47 | 2.47 |
| Crystallized glass | nd | 1.54373 | 1.5437 | 1.54369 | 1.54375 |
| | vd | 55.8 | 55.8 | 55.7 | 55.8 |
| | Wavelength for 80% transmittance (nm) | 482 | 480 | 481 | 480 |
| | Wavelength for 5% transmittance (nm) | 379 | 378 | 378 | 379 |
| | Specific gravity | 2.54 | 2.54 | 2.54 | 2.54 |
| | α(0° C. to 50° C.) (×10⁻⁷/° C.) | −0.31 | −0.45 | −0.35 | −0.5 |

TABLE 6

| | Sample | Comparative Examples | |
|---|---|---|---|
| | | 1 | 2 |
| Composition [% by mass] | $SiO_2$ | 55.500 | 60.380 |
| | $Al_2O_3$ | 24.500 | 23.570 |
| | $P_2O_5$ | 7.500 | 5.420 |
| | $Li_2O$ | 3.800 | 2.810 |
| | MgO | 1.000 | 1.810 |
| | CaO | 1.050 | 0.000 |
| | BaO | 0.765 | 0.000 |
| | ZnO | 1.085 | 0.990 |
| | $ZrO_2$ | 2.000 | 2.510 |
| | $TiO_2$ | 2.300 | 2.510 |
| | $As_2O_3$ | 0.500 | 0.000 |
| | Total | 100.000 | 100.000 |
| | BaO + ZnO | 1.850 | 0.990 |
| | $SiO_2 + Al_2O_3 + P_2O_5$ | 87.500 | 89.370 |
| | $P_2O_5/SiO_2$ | 0.135 | 0.090 |
| | $P_2O_5/Al_2O_3$ | 0.306 | 0.230 |
| | $TiO_2 + ZrO_2$ | 4.300 | 5.020 |
| | Number of bubbles remaining (bubbles/cm³) | 0 | 33 |
| Amorphous glass | nd | 1.52760 | — |
| | vd | 57.8 | — |
| | Wavelength for 80% transmittance (nm) | 373 | — |
| | Wavelength for 5% transmittance (nm) | 328 | — |
| | Specific gravity | 2.46 | — |
| Crystallized glass | nd | 1.54454 | — |
| | vd | 56.0 | — |
| | Wavelength for 80% transmittance (nm) | 442 | — |
| | Wavelength for 5% transmittance (nm) | 380 | — |
| | Specific gravity | 2.54 | — |
| | α(0° C. to 50° C.) (×10⁻⁷/° C.) | −0.02 | 8.10 |

TABLE 7

| Raw material | Examples | | | |
|---|---|---|---|---|
| (% by mass) | 1 | 2 | 3 | 4 |
| $SiO_2$ | 51.779 | 51.745 | 51.648 | 51.653 |
| $Al_2O_3$ | 21.182 | 21.168 | 21.129 | 21.131 |
| $Al(PO_3)_3$ | 8.672 | 8.667 | 8.650 | 8.651 |
| $Li_2CO_3$ | 8.767 | 8.761 | 8.744 | 8.745 |
| MgO | 0.933 | 0.932 | 0.931 | 0.931 |
| $CaCO_3$ | 1.748 | 1.747 | 1.744 | 1.744 |
| $Ba(NO_3)_2$ | 1.670 | 1.828 | 2.221 | 2.253 |
| $BaSO_4$ | 0.071 | 0.071 | 0.141 | 0.071 |
| ZnO | 1.166 | 1.072 | 0.791 | 0.819 |
| $ZrO_2$ | 1.866 | 1.865 | 1.861 | 1.861 |
| $TiO_2$ | 2.146 | 2.144 | 2.140 | 2.141 |
| Total | 100 | 100 | 100 | 100 |

TABLE 8

| Raw material | Examples | | | |
|---|---|---|---|---|
| (% by mass) | 5 | 6 | 7 | 8 |
| $SiO_2$ | 51.937 | 52.190 | 52.812 | 52.078 |
| $Al_2O_3$ | 21.225 | 21.363 | 21.426 | 21.316 |
| $Al(PO_3)_3$ | 8.652 | 8.795 | 8.821 | 8.775 |
| $Li_2CO_3$ | 8.746 | 9.004 | 8.799 | 9.215 |
| MgO | 0.931 | 0.934 | 0.843 | 0.932 |
| $CaCO_3$ | 1.827 | 1.333 | 0.836 | 1.663 |
| $Ba(NO_3)_2$ | 2.173 | 1.623 | 1.756 | 1.461 |
| $BaSO_4$ | 0.042 | 0.043 | 0.071 | 0.042 |
| ZnO | 0.465 | 0.794 | 0.890 | 0.512 |
| $ZrO_2$ | 1.861 | 1.867 | 1.873 | 1.863 |
| $TiO_2$ | 2.141 | 2.054 | 1.873 | 2.143 |
| Total | 100 | 100 | 100 | 100 |

TABLE 9

| Raw material | Examples | | | |
|---|---|---|---|---|
| (% by mass) | 9 | 10 | 11 | 12 |
| $SiO_2$ | 47.251 | 51.025 | 52.472 | 51.415 |
| $Al_2O_3$ | 23.205 | 22.527 | 20.174 | 22.943 |
| $Al(PO_3)_3$ | 7.016 | 9.399 | 9.225 | 6.973 |
| $Li_2CO_3$ | 8.213 | 7.872 | 7.592 | 9.038 |
| MgO | 4.678 | 1.311 | 0.670 | 1.295 |
| $CaCO_3$ | 0.083 | 2.506 | 1.029 | 2.675 |
| $Ba(NO_3)_2$ | 2.472 |  | 4.757 | 1.609 |
| $BaSO_4$ | 1.422 | 1.708 | 0.071 | 0.703 |
| ZnO | 2.386 | 0.375 | 0.577 | 0.925 |
| $ZrO_2$ | 1.871 | 1.217 | 2.093 | 0.925 |
| $TiO_2$ | 1.403 | 2.060 | 1.340 | 1.499 |
| Total | 100 | 100 | 100 | 100 |

TABLE 10

| Raw material | Examples | | | |
|---|---|---|---|---|
| (% by mass) | 13 | 14 | 15 | 16 |
| $SiO_2$ | 52.010 | 54.834 | 55.208 | 46.543 |
| $Al_2O_3$ | 21.885 | 19.642 | 20.399 | 19.968 |
| $Al(PO_3)_3$ | 6.907 | 5.857 | 5.798 | 10.277 |
| $Li_2CO_3$ | 10.335 | 7.011 | 10.422 | 8.383 |
| MgO | 0.929 | 0.945 | 1.112 | 1.649 |
| $CaCO_3$ | 0.829 | 0.852 | 1.323 | 4.170 |
| $Ba(NO_3)_2$ | 1.108 | 3.716 |  | 3.123 |
| $BaSO_4$ | 0.424 | 0.996 | 1.690 | 0.766 |
| ZnO | 0.929 | 1.890 | 0.741 | 0.916 |
| $ZrO_2$ | 1.393 | 1.890 | 1.408 | 3.207 |
| $TiO_2$ | 3.251 | 2.367 | 1.899 | 1.008 |
| Total | 100 | 100 | 100 | 100 |

TABLE 11

| Raw material | Examples | | | |
|---|---|---|---|---|
| (% by mass) | 17 | 18 | 19 | 20 |
| $SiO_2$ | 51.697 | 51.394 | 51.710 | 51.497 |
| $Al_2O_3$ | 21.148 | 21.024 | 21.154 | 21.067 |
| $Al(PO_3)_3$ | 8.659 | 8.608 | 8.661 | 8.626 |
| $Li_2CO_3$ | 8.638 | 7.786 | 8.755 | 8.719 |
| $Li_2SO_4$ | 0.199 | 1.586 | 0.000 | 0.000 |
| MgO | 0.931 | 0.926 | 0.932 | 0.928 |
| $CaCO_3$ | 1.746 | 1.735 | 1.746 | 1.739 |
| $Ba(NO_3)_2$ | 1.905 | 1.894 | 1.905 | 1.898 |
| ZnO | 1.071 | 1.065 | 1.048 | 0.881 |
| $ZnSO_4$ | 0.000 | 0.000 | 0.082 | 0.656 |
| $ZrO_2$ | 1.863 | 1.852 | 1.863 | 1.856 |
| $TiO_2$ | 2.142 | 2.130 | 2.143 | 2.134 |
| Total | 100.000 | 100.000 | 100.000 | 100.000 |

The crystallized glass of the present invention is expected to be used, as mirror substrate materials and photomask substrate materials, in next-generation semiconductor production devices utilizing extreme ultraviolet lithography (EUVL), and is applicable to masks for lithography, optical reflection mirrors, parts of semiconductor production equipments such as wafer stages and reticle, parts of liquid-crystal exposure devices, parts of large-size reflection mirrors, as well as to other various precision members such as parts of standard scales, prototypes and testers. Because of having high transparency, the glass ceramics of the present invention are usable in various applications which require high optical transmittance such as substrates for optical filters, and transmission masks for lithography. In addition, the glass ceramics of the present invention are applicable to other various members because of having high mechanical strength, and they may be effectively worked for weight reduction.

What is claimed is:

1. A crystallized glass which contains none of an $As_2O_3$ component, a $Sb_2O_3$ component, a $SnO_2$ component, and a $CeO_2$ component (on an oxide basis) as a clarifying agent, comprising, in terms of percent by mass on an oxide basis:
   an $SiO_2$ component included at 30-70%,
   an $Al_2O_3$ component included at 10-40%,
   a $Li_2O$ component included at more than 0% and equal to or less than 10%,
   a $P_2O_5$ component included at 5-15%,
   a $TiO_2$ component included at 1-10%,
   a ZnO component included at 0-5.5%, and
   a BaO component included at more than 0% and equal to or less than 5%,
   wherein the total content of the BaO component and the ZnO component (on an oxide basis) is 1.9% by mass or more.

2. The crystallized glass according to claim 1, containing β-quartz and/or β-quartz solid solution as main crystal phase(s).

3. The crystallized glass according to claim 1, wherein the main crystal phase has an average crystal particle size of 5-200 nm.

4. The crystallized glass according to claim 1, wherein an average linear thermal expansion coefficient within a temperature range of 0-50° C. is within a range of $0.0 \pm 1.0 \times 10^{-6}/°$C.

5. The crystallized glass according to claim 1, comprising, in terms of percent by mass on an oxide basis: a $ZrO_2$ component included at 1-10%.

6. The crystallized glass according to claim 1, comprising, in terms of percent by mass on an oxide basis, an MgO component included at 0-5%, and a CaO component included at 0-5%.

* * * * *